(12) United States Patent
Zhang et al.

(10) Patent No.: US 12,513,323 B2
(45) Date of Patent: Dec. 30, 2025

(54) POINT CLOUD ENCODING/DECODING PROCESSING METHOD AND APPARATUS, ENCODING DEVICE, AND DECODING DEVICE

(71) Applicant: VIVO MOBILE COMMUNICATION CO., LTD., Guangdong (CN)

(72) Inventors: Wei Zhang, Guangdong (CN); Fuzheng Yang, Guangdong (CN); Jiaming Nie, Guangdong (CN); Zhuoyi Lv, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/731,882

(22) Filed: Jun. 3, 2024

(65) Prior Publication Data
US 2024/0323424 A1 Sep. 26, 2024

Related U.S. Application Data

(63) Continuation of application No. PCT/CN2022/135882, filed on Dec. 1, 2022.

(30) Foreign Application Priority Data

Dec. 3, 2021 (CN) .......................... 202111466398.4

(51) Int. Cl.
*H04N 19/503* (2014.01)
*H04N 19/119* (2014.01)
(Continued)

(52) U.S. Cl.
CPC ......... *H04N 19/503* (2014.11); *H04N 19/119* (2014.11); *H04N 19/172* (2014.11);
(Continued)

(58) Field of Classification Search
None
See application file for complete search history.

(56) References Cited

U.S. PATENT DOCUMENTS

| 12,363,285 | B2 * | 7/2025 | Zhao | H04N 19/157 |
| 2021/0144403 | A1 * | 5/2021 | Lasserre | G06T 9/001 |
| 2021/0321101 | A1 * | 10/2021 | Yang | H04N 19/124 |

FOREIGN PATENT DOCUMENTS

| CN | 112740702 A | 4/2021 |
| EP | 4329312 A1 | 2/2024 |
| WO | 2022042538 A1 | 3/2022 |

OTHER PUBLICATIONS

Extended European Search Report for Application No. 22900611.9, dated Feb. 19, 2025, 14 Pages.

(Continued)

*Primary Examiner* — Talha M Nawaz
(74) *Attorney, Agent, or Firm* — BROOKS KUSHMAN P.C.

(57) ABSTRACT

A point cloud encoding/decoding processing method and apparatus, an encoding device, and a decoding device. The point cloud encoding processing method according to the embodiments of this application includes: performing, by an encoding end, synchronous multi-branch tree division on a current frame to be encoded and an encoded frame; and performing, by the encoding end based on a target value corresponding to a first node in the encoded frame, inter prediction on an occupancy status of a second node in the frame to be encoded, where the occupancy status includes: occupied or unoccupied, where a position of the first node in the encoded frame is the same as a position of the second node in the frame to be encoded.

20 Claims, 8 Drawing Sheets

(51) Int. Cl.
*H04N 19/172* (2014.01)
*H04N 19/597* (2014.01)
*H04N 19/91* (2014.01)
*H04N 19/96* (2014.01)

(52) U.S. Cl.
CPC ........... *H04N 19/597* (2014.11); *H04N 19/91* (2014.11); *H04N 19/96* (2014.11)

(56) References Cited

OTHER PUBLICATIONS

3DG "Coding of moving pictures and audio" ISO/IEC JTC 1/SC 29/WG 11, Approved WG 11 document, N19091, UNI (Italy), Mar. 2020, 91 Pages.

\* cited by examiner

POINT CLOUD ENCODING/DECODING PROCESSING METHOD AND APPARATUS, ENCODING DEVICE, AND DECODING DEVICE

CROSS-REFERENCE TO RELATED APPLICATIONS

This application is a continuation of International Application No. PCT/CN2022/135882 filed on Dec. 1, 2022, which claims priority to Chinese Patent Application No. 202111466398.4 filed on Dec. 3, 2021, which are incorporated herein by reference in their entireties.

TECHNICAL FIELD

This application pertains to the field of audio/video processing technologies, and in particular, to a point cloud encoding/decoding processing method and apparatus, an encoding device, and a decoding device.

BACKGROUND

At present, in the inter encoding scheme, for each bit of the space occupation code of the frame to be encoded, there are 2 situations for the inter prediction context based on the density of the point cloud: for the point determined as sparse slice, if the inter prediction occupation code is 1, and at least 4 of 7 sub-layer neighbors of the current layer in the frame are not empty, occupancy statuses of all sub-layer neighbors in a context model 1 are set to 1. Otherwise, the specific number of non-empty neighbors are added on the basis of non-empty neighbors in the existing frame by bitwise or operation. For the point determined as dense slice, if the inter prediction occupancy code is 1, at least 3 of 3 coplanar nodes and 3 collinear nodes in the first layer are not empty, and at least 2 of 3 coplanar nodes in the second layer are not empty, in a context model 2, occupancy statuses of encoded neighboring blocks and a parent node of the current sub-block to be encoded at the first layer are all set to 1, including 3 coplanar nodes and 3 collinear nodes; and occupancy statuses of the encoded neighboring blocks at the same depth of the current sub-block to be encoded at the second layer are all set to 1, including 3 coplanar nodes. Otherwise, the specific number of non-empty neighbors are added on the basis of non-empty neighbors in the existing frame by bitwise or operation.

The inter encoding scheme has relatively low accuracy for inter prediction.

SUMMARY

Embodiments of this application provide a point cloud encoding/decoding processing method and apparatus, an encoding device, and a decoding device.

According to a first aspect, a point cloud encoding processing method is provided, and the method includes:
performing, by an encoding end, synchronous multi-branch tree division on a current frame to be encoded and an encoded frame; and
performing, by the encoding end based on a target value corresponding to a first node in the encoded frame, inter prediction on an occupancy status of a second node in the frame to be encoded, where the occupancy status includes: occupied or unoccupied, where
a position of the first node in the encoded frame is the same as a position of the second node in the frame to be encoded, and the target value includes one of the following:
the number of points included in a space corresponding to the first node;
density of the points included in the space corresponding to the first node;
the number of points included in a first child node included in the first node, where the first node includes at least one first child node; and
density of the points included in the first child node included in the first node.

According to a second aspect, a point cloud encoding processing apparatus is provided, including:
a first division module, configured to perform synchronous multi-branch tree division on a current frame to be encoded and an encoded frame; and
a first prediction module, configured to perform, based on a target value corresponding to a first node in the encoded frame, inter prediction on an occupancy status of a second node in the frame to be encoded, where the occupancy status includes: occupied or unoccupied, where
a position of the first node in the encoded frame is the same as a position of the second node in the frame to be encoded, and the target value includes:
the number of points included in a space corresponding to the first node;
density of the points included in the space corresponding to the first node;
the number of points included in a first child node included in the first node, where the first node includes at least one first child node; and
density of the points included in the first child node included in the first node.

According to a third aspect, a point cloud decoding processing method is provided, and the method includes:
performing, by a decoding end, synchronous multi-branch tree division on a current frame to be decoded and a decoded frame; and
performing, by the decoding end based on a target value corresponding to a first node in the decoded frame, inter prediction on an occupancy status of a second node in the frame to be decoded, where the occupancy status includes: occupied or unoccupied, where
a position of the first node in the decoded frame is the same as a position of the second node in the frame to be decoded, and the target value includes one of the following:
the number of points included in a space corresponding to the first node;
density of the points included in the space corresponding to the first node;
the number of points included in a first child node included in the first node, where the first node includes at least one first child node; and
density of the points included in the first child node included in the first node.

According to a fourth aspect, a point cloud decoding processing apparatus is provided, including:
a second division module, configured to perform synchronous multi-branch tree division on a current frame to be decoded and a decoded frame; and
a second prediction module, configured to perform, based on a target value corresponding to a first node in the decoded frame, inter prediction on an occupancy status of a second node in the frame to be decoded, where the occupancy status includes: occupied or unoccupied, where a position of the first node in the decoded frame is the same as a position of the second node in the frame to be decoded, and the target value includes:

the number of points included in a space corresponding to the first node;

density of the points included in the space corresponding to the first node;

the number of points included in a first child node included in the first node, where the first node includes at least one first child node; and density of the points included in the first child node included in the first node.

According to a fifth aspect, an encoding device is provided. The encoding device includes a processor and a memory, the memory stores a program or an instruction that can be run on the processor, and the program or the instruction is executed by the processor to implement steps of the method according to the first aspect.

According to a sixth aspect, an encoding device is provided, including a processor and a communications interface, where the processor is configured to: perform synchronous multi-branch tree division on a current frame to be encoded and an encoded frame; and perform, based on a target value corresponding to a first node in the encoded frame, inter prediction on an occupancy status of a second node in the frame to be encoded, where the occupancy status includes: occupied or unoccupied, where a position of the first node in the encoded frame is the same as a position of the second node in the frame to be encoded, and the target value includes one of the following:

the number of points included in a space corresponding to the first node;

density of the points included in the space corresponding to the first node;

the number of points included in a first child node included in the first node, where the first node includes at least one first child node; and density of the points included in the first child node included in the first node.

According to a seventh aspect, a decoding device is provided. The decoding device includes a processor and a memory, the memory stores a program or an instruction that can be run on the processor, and the program or the instruction is executed by the processor to implement steps of the method according to the third aspect.

According to an eighth aspect, a decoding device is provided, including a processor and a communications interface, where the processor is configured to: perform synchronous multi-branch tree division on a current frame to be decoded and a decoded frame; and perform, based on a target value corresponding to a first node in the decoded frame, inter prediction on an occupancy status of a second node in the frame to be decoded, where the occupancy status includes: occupied or unoccupied, where a position of the first node in the decoded frame is the same as a position of the second node in the frame to be decoded, and the target value includes one of the following:

the number of points included in a space corresponding to the first node;

density of the points included in the space corresponding to the first node;

the number of points included in a first child node included in the first node, where the first node includes at least one first child node; and density of the points included in the first child node included in the first node.

According to a ninth aspect, an encoding-decoding system is provided, including an encoding device and a decoding device. The encoding device may be configured to perform steps of the method according to the first aspect, and the decoding device may be configured to perform steps of the method according to the third aspect.

According to a tenth aspect, a readable storage medium is provided, where the readable storage medium stores a program or an instruction, and when the program or the instruction is executed by a processor, steps of the method according to the first aspect or steps of the method according to the third aspect are implemented.

According to an eleventh aspect, a chip is provided. The chip includes a processor and a communications interface, the communications interface is coupled to the processor, and the processor is configured to run a program or an instruction to implement the method according to the first aspect or the third aspect.

According to a twelfth aspect, a computer program/program product is provided, the computer program/program product is stored in a storage medium, and the computer program/program product is executed by at least one processor to implement steps of the method according to the first aspect or the third aspect.

DETAILED DESCRIPTION

Figure 1:
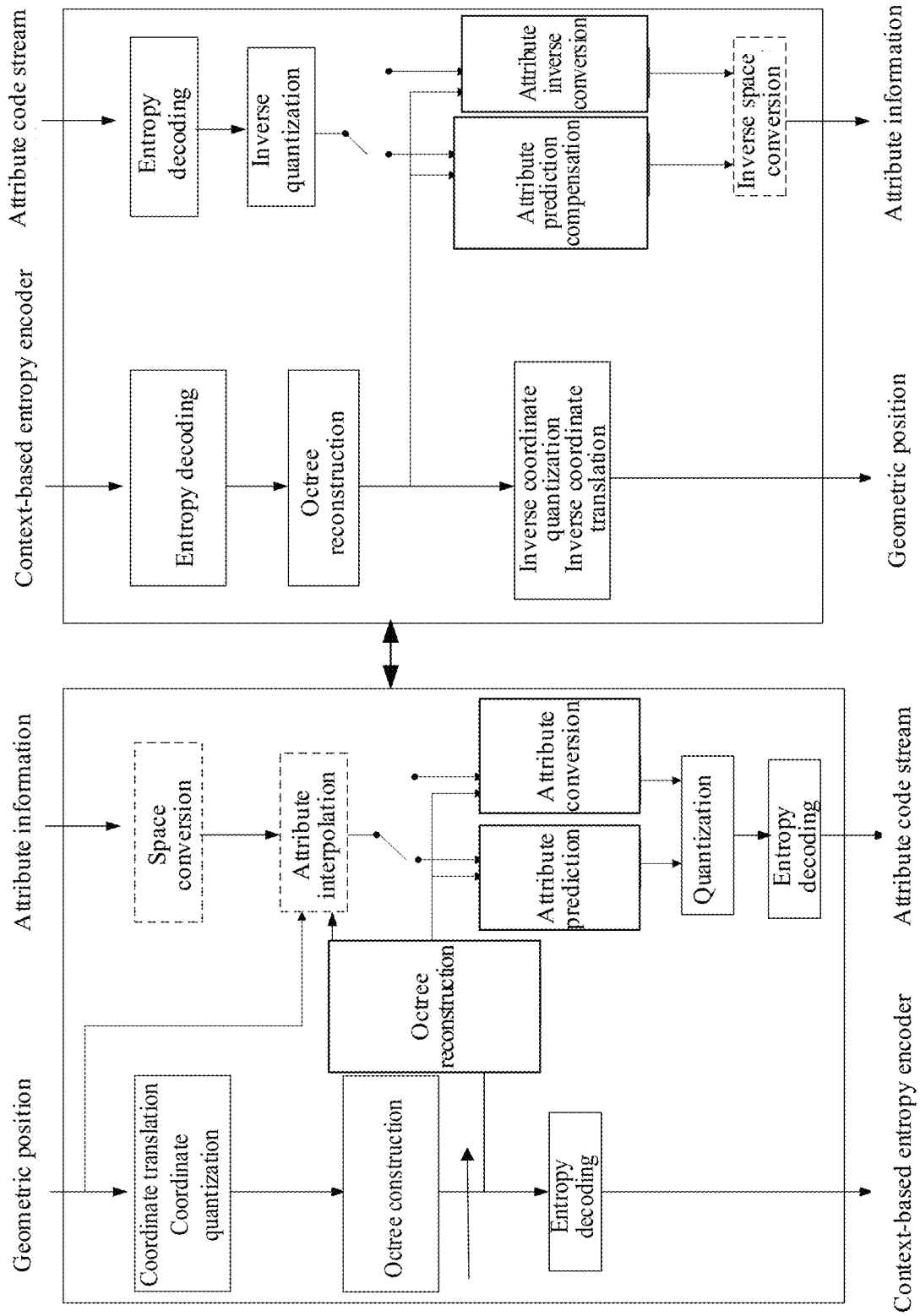
FIG. 1 is a frame diagram of AVS codec.

The following clearly describes technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and the number of objects is not limited, for example, there may be one or more first objects. In addition, in the specification and claims, "and/or" represents at least one of connected objects, and a character "/" generally represents an "or" relationship between associated objects.

It should be noted that technologies described in the embodiments of this application are not limited to a Long Time Evolution (LTE)/LTE-Advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), single-carrier frequency division multiple access (SC-FDMA), and other systems. The terms "system" and "network" in the embodiments of this application may be used interchangeably. The described technologies may be applied to both the systems and the radio technologies mentioned above as well as to other systems and radio technologies. A new radio (NR) system is described in the following description for illustrative purposes, and the NR terminology is used in most of the following description, although these technologies can also be applied to applications other than the NR system application, such as the $6^{th}$ generation (6G) communications system.

The prior art related to this application is briefly introduced as follows.

In the encoder framework of point cloud digital audio video coding standard (AVS), geometric information of the point cloud and attribute information corresponding to each point are encoded separately. First, the point cloud is preprocessed: first, a minimum cuboid including all points that are input to the point cloud is constructed, which is referred to as a bounding box. The origin coordinates of the bounding box are the minimum values of coordinates of points in the point cloud in three dimensions of x, y, and z. Next, the coordinates of the points in the point cloud are transformed: based on this coordinate origin, the original coordinates of the points are transformed into relative coordinates relative to the coordinate origin. Then the geometric coordinates of the points are quantized, which mainly plays the role of scaling. Because of quantization and rounding, pieces of geometric information of some points are the same, and whether to remove these points with repeated geometric information is decided based on parameters. Next, the preprocessed point cloud is divided into octree (quadtree/binary tree) according to the order of breadth-first traversal: the preprocessed bounding box is used as a root node, which is divided into eight parts to generate eight subcubes as child nodes thereof, and eight bits are used to represent occupation information of the child nodes, which is referred to as space occupation code. If there is a point in the subcube, it means that the child node is occupied, and the corresponding occupied bit takes a value of 1, otherwise it takes a value of 0. Continue to divide the occupied subcubes until divided leaf nodes are 1×1×1 cubes, and complete encoding of geometric octree. In the process of octree encoding, entropy encoding is performed on the generated space occupation code and the number of points included in the final leaf node, to get an output code stream. In the process of geometric decoding based on octree, the decoder obtains the occupation code of each node through continuous parsing according to the order of breadth-first traversal, and divides the nodes in turn until 1×1×1 cubes are obtained. The number of points included in each leaf node is obtained through parsing, and finally the point cloud information of geometric reconstruction is recovered.

After the geometric encoding is completed, the geometric information is reconstructed. At present, attribute encoding is mainly aimed at color and reflectivity information. First, it is determined whether to convert the color space, and if so, the color information is converted from RGB color space to YUV color space. Then, the original point cloud is used to recolor the reconstructed point cloud, so that the uncoded attribute information corresponds to the reconstructed geometric information. Color information encoding is divided into two modules: attribute prediction and attribute transformation. The process of attribute prediction is as follows: first, the point clouds are reordered for difference prediction. The method for reordering is Hilbert reordering. Attribute prediction is performed on the ordered point clouds in a difference method, and finally quantization and entropy encoding are performed on the prediction residual to generate a binary code stream. The process of attribute transformation is as follows: first, the point cloud attributes are transformed by wavelet transform, and the transformation coefficients are quantized; then, the attribute reconstruction value is obtained by inverse quantization and inverse wavelet transform; then, a difference between the original attribute and the reconstructed value of the attribute is calculated to obtain the attribute residual, which is quantized then; and finally, entropy encoding is performed on the quantized transform coefficient and attribute residual to generate a binary code stream. FIG. 1 is a frame diagram of AVS codec, and this application relates to geometric encoding and decoding.

Figure 2:
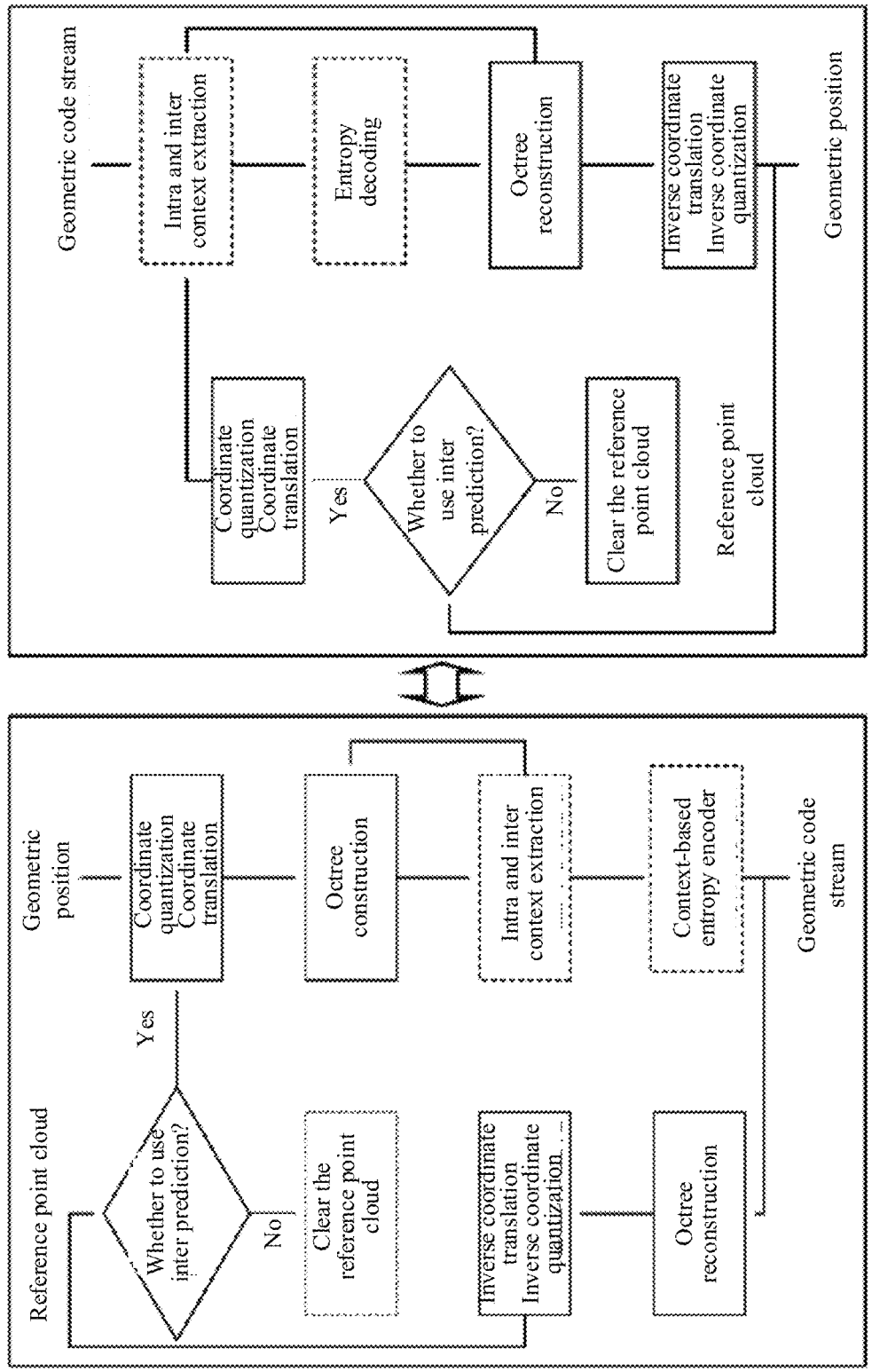
FIG. 2 is an existing inter encoding framework of AVS.

The existing inter encoding framework of AVS is shown in FIG. 2, and a specific procedure of the inter encoding scheme is as follows.

1) Set two frame types: I frame and P frame. A first frame of each sequence is I frame, and only intra prediction is used. All subsequent frames are P frames, and forward inter prediction is performed, with a previous frame as a reference frame.

2) Input the current frame to be encoded, and an encoded point cloud of the previous frame is used as the reference frame. Synchronization tree division is performed on the two frames, and nodes in a corresponding position in the reference frame are used as prediction blocks.

3) Perform the same sub-block division operation on the obtained prediction block with the current block to be encoded, to respectively obtain occupation code information of the prediction block and the current block. For each bit of the space occupation code of the frame to be encoded, there are 2 situations for the inter prediction context based on the density of the point cloud: for the point determined as sparse slice, if the inter prediction occupation code is 1, and at least 4 of 7 sub-layer neighbors of the current layer in the frame are not empty, occupancy statuses of all sub-layer neighbors in a context model 1 are set to 1. Otherwise, the specific number of non-empty neighbors are added on the basis of non-empty neighbors in the existing frame by bitwise or operation. For the point determined as dense slice, if the inter prediction occupancy code is 1, at least 3 of 3 coplanar nodes and 3 collinear nodes in the first layer are not empty, and at least 2 of 3 coplanar nodes in the second layer are not empty, in a context model 2, occupancy statuses of encoded neighboring blocks and a parent node of the current sub-block to be encoded at the first layer are all set to 1, including 3 coplanar nodes and 3 collinear nodes; and occupancy statuses of the encoded neighboring blocks at the same depth of the current sub-block to be encoded at the second layer are all set to 1, including 3 coplanar nodes. Otherwise, the specific number of non-empty neighbors are added on the basis of non-empty neighbors in the existing frame by bitwise or operation.

The technology in this application acts on the octree encoding mode of encoder and decoder in AVS. The proposed technology is located as shown in the dotted box in the figure, which includes 2 parts: intra and inter context extraction and context-based entropy encoder.

A point cloud encoding/decoding processing method and apparatus, an encoding device, and a decoding device provided in the embodiments of this application are described below in detail with reference to the accompanying drawings by using some embodiments and application scenarios thereof.

Figure 3:
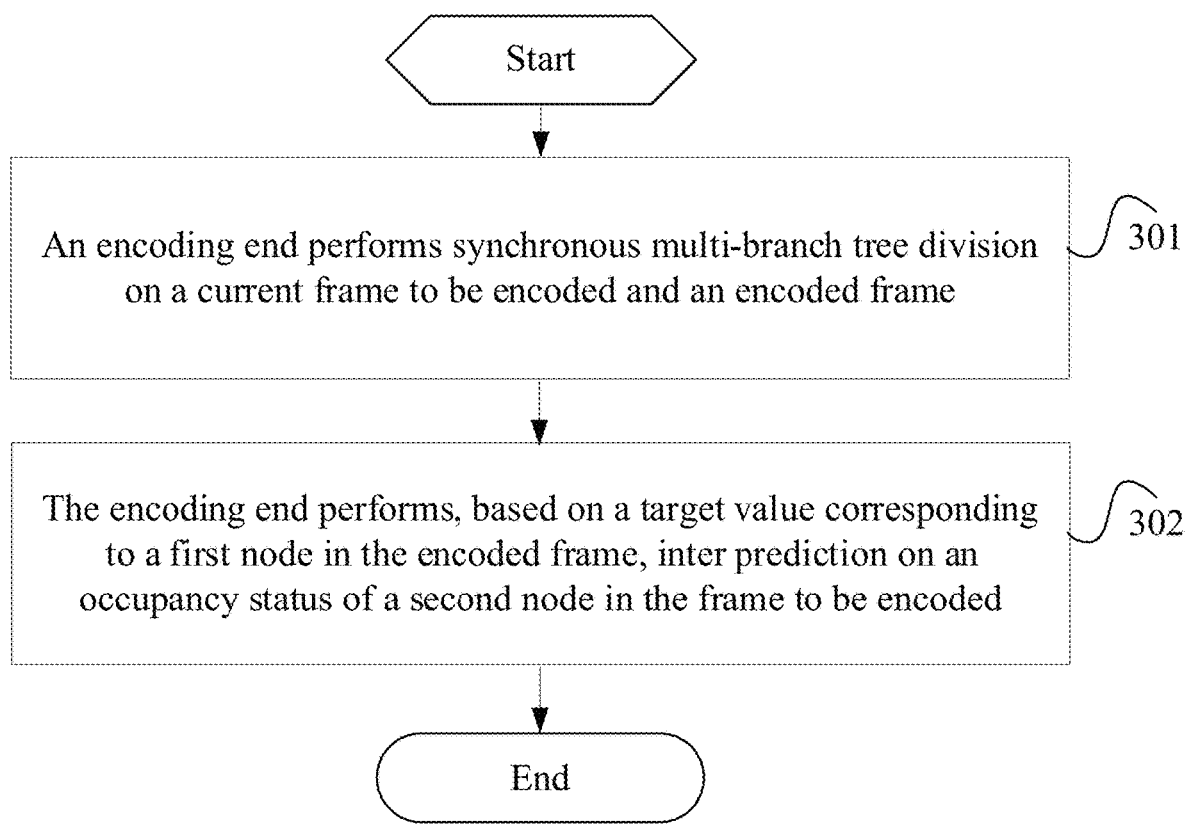
FIG. 3 is a schematic flowchart of a point cloud encoding processing method according to an embodiment of this application.

As shown in FIG. 3, an embodiment of this application provides a point cloud encoding processing method, including the following steps.

Step 301. An encoding end performs synchronous multi-branch tree division on a current frame to be encoded and an encoded frame.

It should be noted that the performing synchronous multi-branch tree division mentioned herein can refer to the division manner such as performing synchronous binary tree division, synchronous quadtree division, or synchronous octree division on the frame to be encoded.

The synchronous multi-branch tree division means that after the frame to be encoded and the encoded frame are divided, sizes and positions of spaces included in the frame to be encoded and the encoded frame are consistent.

Step 302. The encoding end performs, based on a target value corresponding to a first node in the encoded frame, inter prediction on an occupancy status of a second node in the frame to be encoded, where the occupancy status includes: occupied or unoccupied.

A position of the first node in the encoded frame is the same as a position of the second node in the frame to be encoded, and the target value includes one of the following:

A11. the number of points included in a space corresponding to the first node;

A12. density of the points included in the space corresponding to the first node;

A13. the number of points included in a first child node included in the first node, where the first node includes at least one first child node; and A14. density of the points included in the first child node included in the first node.

It should be noted that for A11 and A12, the occupancy statuses of all child nodes of the current node are directly predicted based on points included in the space corresponding to the node in the encoded frame corresponding to the current node in the frame to be encoded, that is, the occupancy statuses of all child nodes of the current node can be predicted by one judgment. However, for A13 and A14, the occupancy status of each child node in the current node in the frame to be encoded is predicted based on points included in each child node included in the node in the encoded frame corresponding to the current node in the frame to be encoded, that is, the number of child nodes in the current node of the frame to be encoded is equal to the number of times for prediction.

Optionally, the encoded frame mentioned in this embodiment of this application may be one or more encoded frames before the frame to be encoded. When the encoded frame is one frame, for example, the encoded frame can be one frame adjacent to the frame to be encoded or one frame with a preset frame number interval from the frame to be encoded. When the encoded frame includes a plurality of frames, for example, the encoded frame may be a plurality of continuous frames adjacent to the frame to be encoded, or a plurality of frames selected at intervals with a preset frame number interval from the frame to be encoded.

It should also be noted herein that when the encoded frame includes a plurality of frames, inter prediction needs to be performed on an occupancy status of the second node based on situations of all first nodes in the plurality of frames. For example, when A11 is performed, the number of points included in the space corresponding to the first node in the plurality of frames can be summed up, and inter prediction may be performed on the occupancy status of the second node by using a sum result, or the number of points included in the space corresponding to the first node in the plurality of frames can be averaged, and inter prediction may be performed on the occupancy status of the second node by using an average value. This implementation is not enumerated in this application.

Optionally, when the target value includes A11 or A12, the implementation that can be used in step 302 includes one of the following.

B11. If the target value is greater than a first preset threshold, predict occupancy statuses of all child nodes of the second node in the frame to be encoded as occupied.

To be specific, when the number of points included in the space corresponding to the first node is greater than the first preset threshold, it is predicted that occupancy statuses of all the child nodes of the second node in the frame to be encoded are occupied; or when the density of points included in the space corresponding to the first node is greater than the first preset threshold, it is predicted that occupancy statuses of all the child nodes of the second node in the frame to be encoded are occupied.

B12. If the target value is less than or equal to a first preset threshold, predict occupancy statuses of all child nodes of the second node in the frame to be encoded as unoccupied.

To be specific, when the number of points included in the space corresponding to the first node is less than or equal to the first preset threshold, it is predicted that occupancy statuses of all the child nodes of the second node in the frame to be encoded are unoccupied; or when the density of points included in the space corresponding to the first node is less than or equal to the first preset threshold, it is predicted that occupancy statuses of all the child nodes of the second node in the frame to be encoded are unoccupied.

It should be noted herein that although the first preset threshold is used in all cases, values of the first preset threshold actually corresponding to A11 and A12 should be different.

Optionally, when the target value includes A13 or A14, the implementation that can be used in step 302 includes one of the following.

C11. If the target value is greater than a second preset threshold, predict an occupancy status of a second child node of the second node in the frame to be encoded as occupied.

It should be noted that, a position of the first child node in the encoded frame is the same as a position of the second child node in the frame to be encoded.

To be specific, when the number of points included in the first child node included in the first node is greater than the second preset threshold, it is predicted that the occupancy status of the second child node of the second node in the frame to be encoded is occupied; or when the density of the points included in the first child node included in the first node is greater than the second preset threshold, it is predicted that the occupancy status of the second child node of the second node in the frame to be encoded is occupied.

C12. If the target value is less than or equal to a second preset threshold, predict an occupancy status of a second child node of the second node in the frame to be encoded as unoccupied.

To be specific, when the number of points included in the first child node included in the first node is less than or equal to the second preset threshold, it is predicted that the occupancy status of the second child node of the second node in the frame to be encoded is unoccupied; or when the density of the points included in the first child node included in the first node is less than or equal to the second preset threshold, it is predicted that the occupancy status of the second child node of the second node in the frame to be encoded is unoccupied.

It should be noted herein that although the second preset threshold is used in all cases, values of the second preset threshold actually corresponding to A13 and A14 should be different.

Optionally, after the inter prediction, entropy encoding also needs to be performed on the occupancy code information of the frame to be encoded based on the prediction situation. Specifically, one of the following implementations can be used.

Implementation 1:

the encoding end obtains first information based on a predicted occupancy status of the frame to be encoded, where the first information is used to determine a first context for encoding the frame to be encoded;

the encoding end determines the first context based on the first information and second information corresponding to the frame to be encoded; and the encoding end performs, based on the first context, entropy encoding on child node occupancy code information of the frame to be encoded.

It should be noted herein that this implementation is as follows: first, one piece of index information (corresponding to the first information) is determined by using the predicted occupancy status of the frame to be encoded. In addition, for the frame to be encoded, neighbor information of the node (namely, nodes that share a face, an edge, or a vertex of the current node) is used for prediction to obtain a prediction result, so as to determine another piece of index information (corresponding to the second information). Then a context (namely, the first context) is jointly determined by using these two pieces of index information, and entropy encoding is performed on the occupancy code information of the child node of the frame to be encoded by using this context.

Examples of the above implementation are as follows: for example, the method of this application corresponds to a set of contexts (including a plurality of contexts), and the method of using neighbor information of nodes also corresponds to a set of contexts. When determining the context of the frame to be encoded, two sets of contexts are combined respectively to form a group of contexts, and each group of contexts includes one of the two sets of contexts. When determining the context, it is first determined which group of contexts to use, and then it is determined which one of the group of contexts to use.

Implementation 2:

the encoding end determines, based on a predicted occupancy status of the frame to be encoded, a first target node with an occupancy status of being unoccupied and a second target node with an occupancy status of being occupied;

the encoding end performs, based on a second context corresponding to the first target node, entropy encoding on occupancy code information of the first target node;

the encoding end determines, based on a predicted occupancy status of the second target node, a third context; and the encoding end performs, based on the third context, entropy encoding on occupancy code information of the second target node.

It should be noted herein that this implementation is as follows: after the occupancy status of the frame to be encoded is predicted based on the prediction manner of this application, the nodes are divided based on the occupancy status. The occupied nodes use a context (corresponding to the third context), and entropy encoding is performed on the occupancy code information of the occupied node by using this context. The unoccupied nodes use another context (corresponding to the second context), and entropy encoding is performed on the occupancy code information of the unoccupied node by using this context.

It should also be noted that the context corresponding to the occupied node in this application is selected from a plurality of preset contexts by searching the context based on the predicted occupancy status. The context corresponding to the unoccupied node is determined by using the neighbor information of the node (namely, nodes that share a face, an edge, or a vertex of the current node) to make prediction, and searching a plurality of preset contexts based on a prediction result.

The following uses octree division as an example, and the specific application of this application is illustrated as follows.

Figure 4:
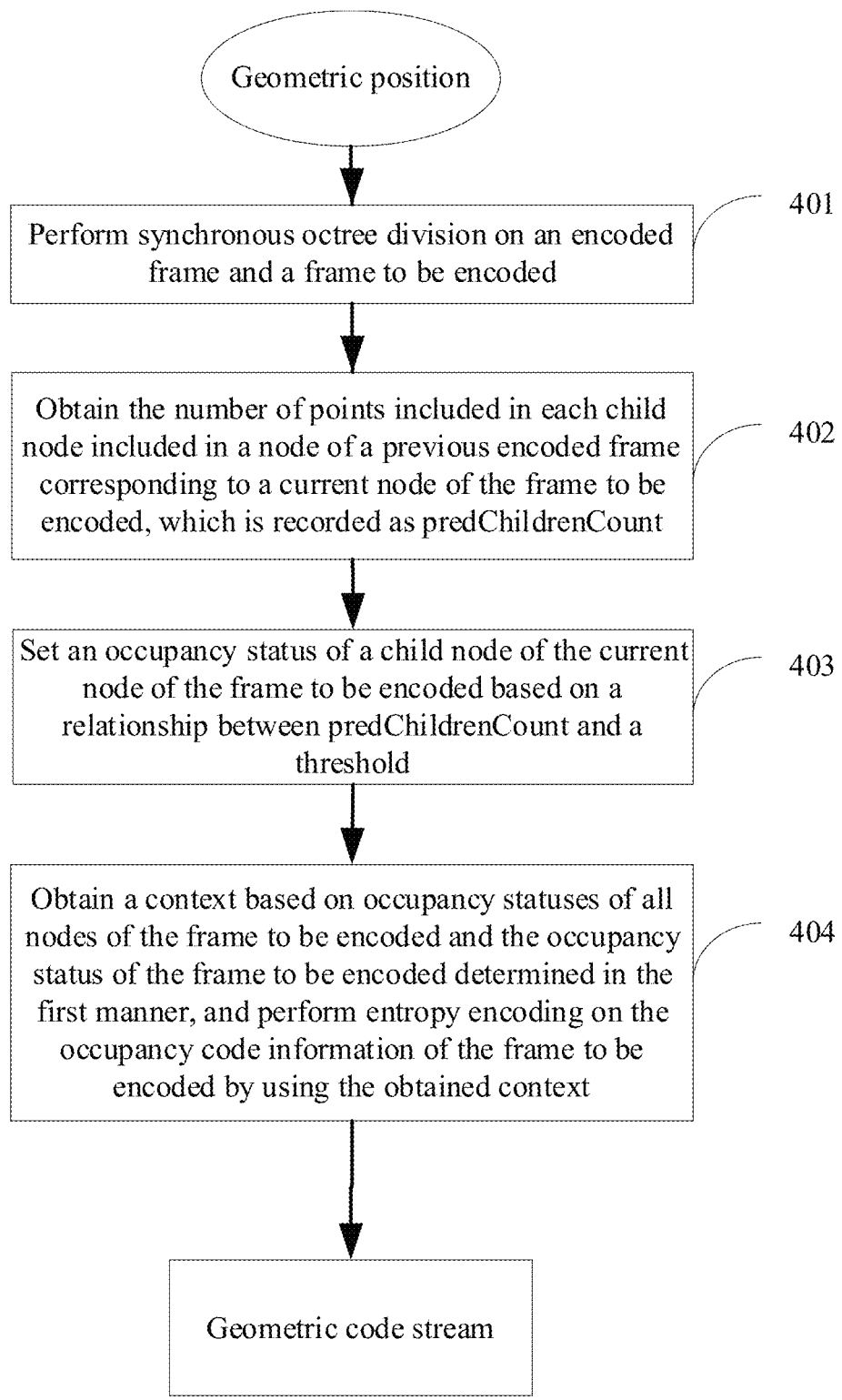
FIG. 4 is a schematic flowchart of an encoding end according to an embodiment of this application.

As shown in FIG. 4, a specific implementation process of the encoding end is as follows.

Step 401. Perform synchronous octree division on an encoded frame and a frame to be encoded.

Step 402. Obtain the number of points included in each child node included in a node of a previous encoded frame corresponding to a current node of the frame to be encoded, which is recorded as predChildrenCount.

Step 403. Set an occupancy status of a child node of the current node of the frame to be encoded based on a relationship between predChildrenCount and a threshold.

If predChildrenCount is greater than the threshold, occupancy probability of the child node of the node of the current frame is relatively large. It is set that countFlag=1, namely, the occupancy status is occupied; otherwise, occupancy probability of the child node of the current frame is relatively small. It is set that countFlag=0, namely, the occupancy status is unoccupied.

Step 404. Obtain a context based on occupancy statuses of all nodes of the frame to be encoded and the occupancy status of the frame to be encoded determined in the first manner, and perform entropy encoding on the occupancy code information of the frame to be encoded by using the obtained context.

It should be noted herein that the first manner refers to predicting the occupancy status of the frame to be encoded by using the neighbor information of nodes (namely, nodes that share a face, an edge, or a vertex of the current node).

It should be noted that the implementation of the decoding end is the same as that of the encoding end, except that the decoding end performs decoding processing on the frame to be decoded. See the implementation of the encoding end for details, that is, how the encoding end codes, and the decoding end decodes in the same way. Details are not described herein again.

Figure 5:
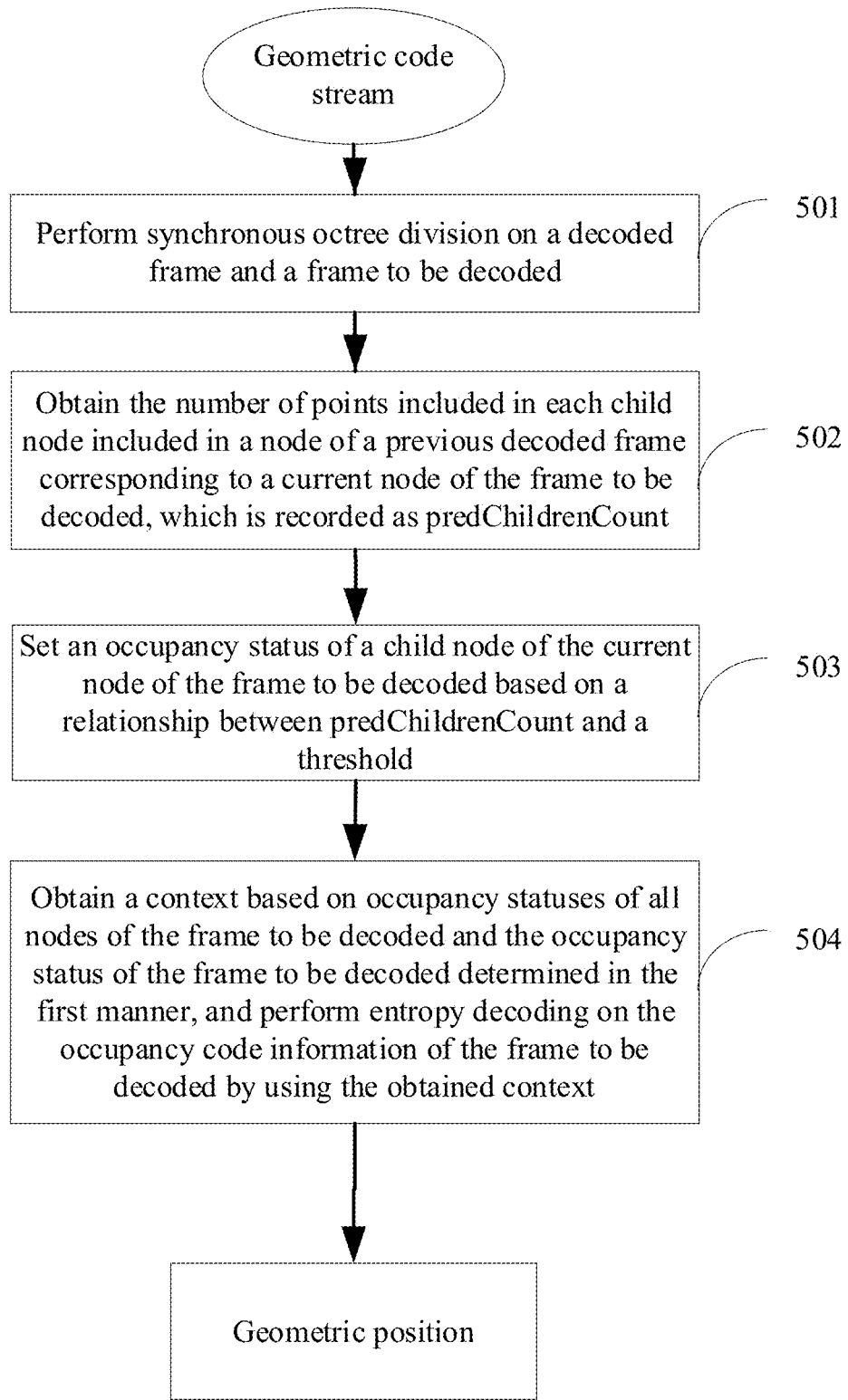
FIG. 5 is a schematic flowchart of a decoding end according to an embodiment of this application.

As shown in FIG. 5, a specific implementation process of the decoding end is as follows.

Step 501. Perform synchronous octree division on a decoded frame and a frame to be decoded.

Step 502. Obtain the number of points included in each child node included in a node of a previous decoded frame corresponding to a current node of the frame to be decoded, which is recorded as predChildrenCount.

Step 503. Set an occupancy status of a child node of the current node of the frame to be decoded based on a relationship between predChildrenCount and a threshold.

If predChildrenCount is greater than the threshold, occupancy probability of the child node of the node of the current frame is relatively large. It is set that countFlag=1, namely, the occupancy status is occupied; otherwise, occupancy probability of the child node of the current frame is relatively small. It is set that countFlag=0, namely, the occupancy status is unoccupied.

Step 504. Obtain a context based on occupancy statuses of all nodes of the frame to be decoded and the occupancy status of the frame to be decoded determined in the first manner, and perform entropy decoding on the occupancy code information of the frame to be decoded by using the obtained context.

It should be noted that this application optimizes the inter technology and considers the time-domain correlation of the number of inter nodes (or the density of points). On the premise of slightly increasing the encoding/decoding complexity, the proposed technology has the following beneficial effects.

This application can reduce the code stream size of encoding without changing a geometric peak signal to noise ratio (PSNR). As shown in Table 1, BD-rate performance of the reconstructed point cloud becomes better in C1 (geometric loss and attribute loss), and bpp performance becomes better in C4 (geometric lossless and attribute lossless). (PSNR is an objective standard for image evaluation, and the greater the PSNR is, the better the image quality. BD-rate is a parameter used to measure the performance. When BD-rate is negative, it indicates that the performance becomes better. On this basis, the greater the absolute value of BD-rate is, the greater the gain of performance is. bpp is used to measure the code stream size in lossless situations, being less than 100% indicates that the performance is getting better, and on this basis, the smaller the absolute value is, the greater the gain is). After the geometric information of some multi-frame point cloud sequences on AVS platform under C1 (geometric loss, attribute loss) and C4 (geometric losses, attribute losses) situations is tested, results are shown in Table 2.

TABLE 1

Performance comparison result C1 between this application and pcrm-5.0-inter-3.0

| Sequence name | BD-rate(D1) | BD-rate(D1_H) |
|---|---|---|
| ford_01 | −0.5% | −0.5% |
| ford_02 | −0.3% | −0.3% |
| ford_03 | −0.3% | −0.3% |

TABLE 2

Performance comparison result C4 between this application and pcrm-5.0-inter-3.0

| Sequence name | bpp |
|---|---|
| ford_01 | 99.9% |
| ford_02 | 99.9% |
| ford_03 | 99.9% |

The point cloud encoding processing method provided in this embodiment of this application may be executed by a point cloud encoding processing apparatus. In this embodiment of this application, an example in which the point cloud encoding processing apparatus performs the point cloud encoding processing method is used to describe the point cloud encoding processing apparatus provided in this embodiment of this application.

Figure 6:
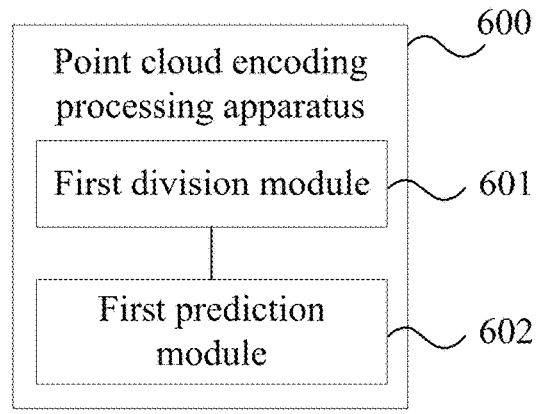
FIG. 6 is a schematic diagram of modules of a point cloud encoding processing apparatus according to an embodiment of this application.

As shown in FIG. 6, an embodiment of this application provides a point cloud encoding processing apparatus 600, including:

a first division module 601, configured to perform synchronous multi-branch tree division on a current frame to be encoded and an encoded frame; and a first prediction module 602, configured to perform, based on a target value corresponding to a first node in the encoded frame, inter prediction on an occupancy status of a second node in the frame to be encoded, where the occupancy status includes: occupied or unoccupied, where a position of the first node in the encoded frame is the same as a position of the second node in the frame to be encoded, and the target value includes:

the number of points included in a space corresponding to the first node;

density of the points included in the space corresponding to the first node;

the number of points included in a first child node included in the first node, where the first node includes at least one first child node; and density of the points included in the first child node included in the first node.

Optionally, the target value includes the number of points included in the space corresponding to the first node or the density of the points included in the space corresponding to the first node, and the first prediction module 602 is configured to:

if the target value is greater than a first preset threshold, predict occupancy statuses of all child nodes of the second node in the frame to be encoded as occupied; or if the target value is less than or equal to a first preset threshold, predict occupancy statuses of all child nodes of the second node in the frame to be encoded as unoccupied.

Optionally, the target value includes the number of points included in the first child node included in the first node or the density of the points included in the first child node included in the first node, and the first prediction module 602 is configured to:

if the target value is greater than a second preset threshold, predict an occupancy status of a second child node of the second node in the frame to be encoded as occupied; or if the target value is less than or equal to a second preset threshold, predict an occupancy status of a second child node of the second node in the frame to be encoded as unoccupied, where a position of the first child node in the encoded frame is the same as a position of the second child node in the frame to be encoded.

Optionally, the apparatus further includes:

a first obtaining module, configured to obtain first information based on a predicted occupancy status of the frame to be encoded, where the first information is used to determine a first context for encoding the frame to be encoded;

a first determining module, configured to determine the first context based on the first information and second information corresponding to the frame to be encoded; and a first encoding module, configured to perform, based on the first context, entropy encoding on child node occupancy code information of the frame to be encoded.

Optionally, the apparatus further includes:

a second determining module, configured to determine, based on a predicted occupancy status of the frame to be encoded, a first target node with an occupancy status of being unoccupied and a second target node with an occupancy status of being occupied;

a second encoding module, configured to perform, based on a second context corresponding to the first target node, entropy encoding on occupancy code information of the first target node;

a third determining module, configured to determine, based on a predicted occupancy status of the second target node, a third context; and a third encoding module, configured to perform, based on the third context, entropy encoding on occupancy code information of the second target node.

It should be noted that inter prediction is performed on the occupancy status of the second node in the frame to be encoded by using the target value corresponding to the first node in the encoded frame, so that the occupancy status of the node can be accurately predicted, and accuracy of inter prediction can be ensured.

The point cloud encoding processing apparatus in this embodiment of this application may be an electronic device, for example, an electronic device with an operating system, or may be a component in the electronic device, for example, an integrated circuit or a chip. The electronic device may be a terminal, or another device other than the terminal. For example, the terminal may include but is not limited to the foregoing listed types of the terminal 11. The another device may be a server, a network attached storage (NAS), and the like. This is not specifically limited in this embodiment of this application.

The point cloud encoding processing apparatus provided in this embodiment of this application can implement the processes implemented in the method embodiment shown in FIG. 3, and achieve a same technical effect. To avoid repetition, details are not provided herein again.

An embodiment of this application further provides an encoding device, including a processor and a communications interface, and the processor is configured to: perform synchronous multi-branch tree division on a current frame to be encoded and an encoded frame; and perform, based on a target value corresponding to a first node in the encoded frame, inter prediction on an occupancy status of a second node in the frame to be encoded, where the occupancy status includes: occupied or unoccupied, where a position of the first node in the encoded frame is the same as a position of the second node in the frame to be encoded, and the target value includes one of the following:

the number of points included in a space corresponding to the first node;

density of the points included in the space corresponding to the first node;

the number of points included in a first child node included in the first node, where the first node includes at least one first child node; and density of the points included in the first child node included in the first node.

This encoding device embodiment is corresponding to the foregoing method embodiment. Each implementation process and implementation of the foregoing method embodiment may be applicable to this encoding device embodiment, and a same technical effect can be achieved. Specifically, FIG. 6 is a schematic diagram of a hardware structure of an encoding device according to an embodiment of this application.

The encoding device 700 includes but is not limited to at least a part of components such as a radio frequency unit 701, a network module 702, an audio output unit 703, an input unit 704, a sensor 705, a display unit 706, a user input unit 707, an interface unit 708, a memory 709, and a processor 710.

Figure 7:
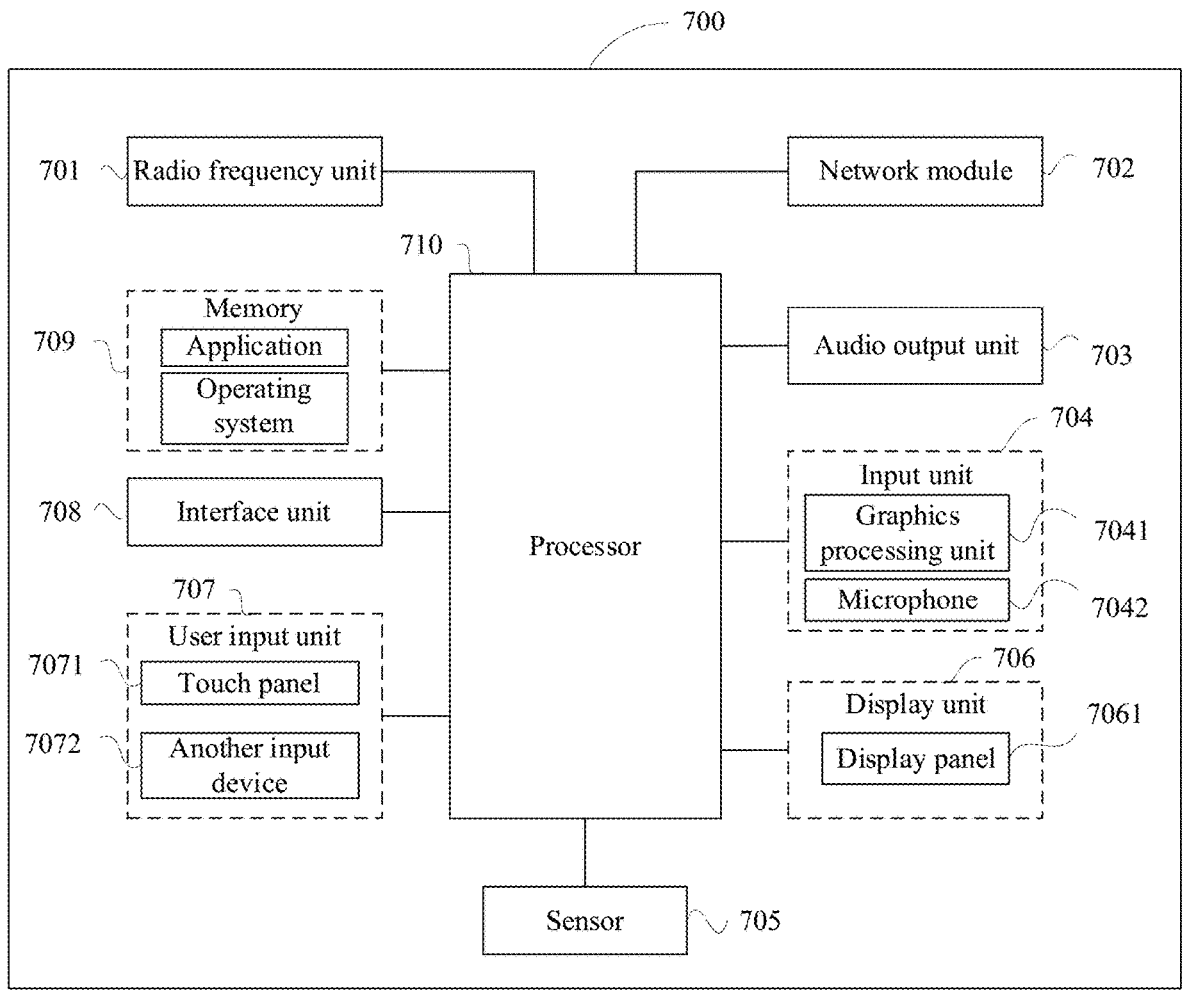
FIG. 7 is a block diagram of a structure of an encoding device according to an embodiment of this application.

A person skilled in the art can understand that the point cloud encoding processing apparatus 700 may further include a power supply (such as a battery) that supplies power to each component. The power supply may be logically connected to the processor 710 by using a power supply management system, to implement functions such as charging and discharging management, and power consumption management by using the power supply management system. The structure of the terminal shown in FIG. 7 constitutes no limitation on the terminal. The terminal may include more or fewer components than those shown in the figure, combine some components, or have different component arrangements. Details are not described herein.

It should be understood that in this embodiment of this application, the input unit 704 may include a graphics processing unit (GPU) 7041 and a microphone 7042. The graphics processing unit 7041 processes image data of a static picture or a video obtained by an image capture apparatus (for example, a camera) in a video capture mode or an image capture mode. The display unit 706 may include a display panel 7061. The display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network-side device and then sends the downlink data to the processor 710 for processing; and sends uplink data to the network-side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, an application or an instruction required by at least one function (for example, a sound playing function or an image playing function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 710 may include one or more processing units. Optionally, an application processor and a modem processor may be integrated into the processor 710. The application processor mainly processes an operating system, a user interface, an application, an instruction, or the like. The modem processor mainly processes wireless communication, for example, a baseband processor. It may be understood that the modem processor may alternatively not be integrated into the processor 710.

The processor 710 is configured to:
perform synchronous multi-branch tree division on a current frame to be encoded and an encoded frame; and
perform, based on a target value corresponding to a first node in the encoded frame, inter prediction on an occupancy status of a second node in the frame to be encoded, where the occupancy status includes: occupied or unoccupied, where
a position of the first node in the encoded frame is the same as a position of the second node in the frame to be encoded, and the target value includes one of the following:
the number of points included in a space corresponding to the first node;
density of the points included in the space corresponding to the first node;
the number of points included in a first child node included in the first node, where the first node includes at least one first child node; and
density of the points included in the first child node included in the first node.

The encoding device in this embodiment of this application performs inter prediction on the occupancy status of the second node in the frame to be encoded by using the target value corresponding to the first node in the encoded frame, so that the occupancy status of the node can be accurately predicted, and accuracy of inter prediction can be ensured.

Optionally, the target value includes the number of points included in the space corresponding to the first node or the density of the points included in the space corresponding to the first node, and the processor 710 is configured to:
if the target value is greater than a first preset threshold, predict occupancy statuses of all child nodes of the second node in the frame to be encoded as occupied; or
if the target value is less than or equal to a first preset threshold, predict occupancy statuses of all child nodes of the second node in the frame to be encoded as unoccupied.

Optionally, the target value includes the number of points included in the first child node included in the first node or the density of the points included in the first child node included in the first node, and the processor 710 is configured to:
if the target value is greater than a second preset threshold, predict an occupancy status of a second child node of the second node in the frame to be encoded as occupied; or
if the target value is less than or equal to a second preset threshold, predict an occupancy status of a second child node of the second node in the frame to be encoded as unoccupied, where
a position of the first child node in the encoded frame is the same as a position of the second child node in the frame to be encoded.

Optionally, the processor is further configured to:
obtain first information based on a predicted occupancy status of the frame to be encoded, where the first information is used to determine a first context for encoding the frame to be encoded;
determine the first context based on the first information and second information corresponding to the frame to be encoded; and
perform, based on the first context, entropy encoding on child node occupancy code information of the frame to be encoded.

Optionally, the processor is further configured to:
determine, based on a predicted occupancy status of the frame to be encoded, a first target node with an occupancy status of being unoccupied and a second target node with an occupancy status of being occupied;
perform, based on a second context corresponding to the first target node, entropy encoding on occupancy code information of the first target node;
determine, based on a predicted occupancy status of the second target node, a third context; and
perform, based on the third context, entropy encoding on occupancy code information of the second target node.

Preferably, an embodiment of this application further provides an encoding device, including a processor, a memory, and a program or an instruction stored in the memory and executable on the processor. When the program or the instruction is executed by the processor, processes of the point cloud encoding processing method embodiment are implemented, and a same technical effect can be achieved. To avoid repetition, details are not described herein again.

An embodiment of this application further provides a readable storage medium. The readable storage medium stores a program or an instruction, and when the program or the instruction is executed by a processor, processes of the point cloud encoding processing method embodiment are performed, and a same technical effect can be achieved. To avoid repetition, details are not described herein again. The computer-readable storage medium is, for example, a read-only memory (ROM for short), a random access memory (RAM for short), a magnetic disk, or an optical disc.

Figure 8:
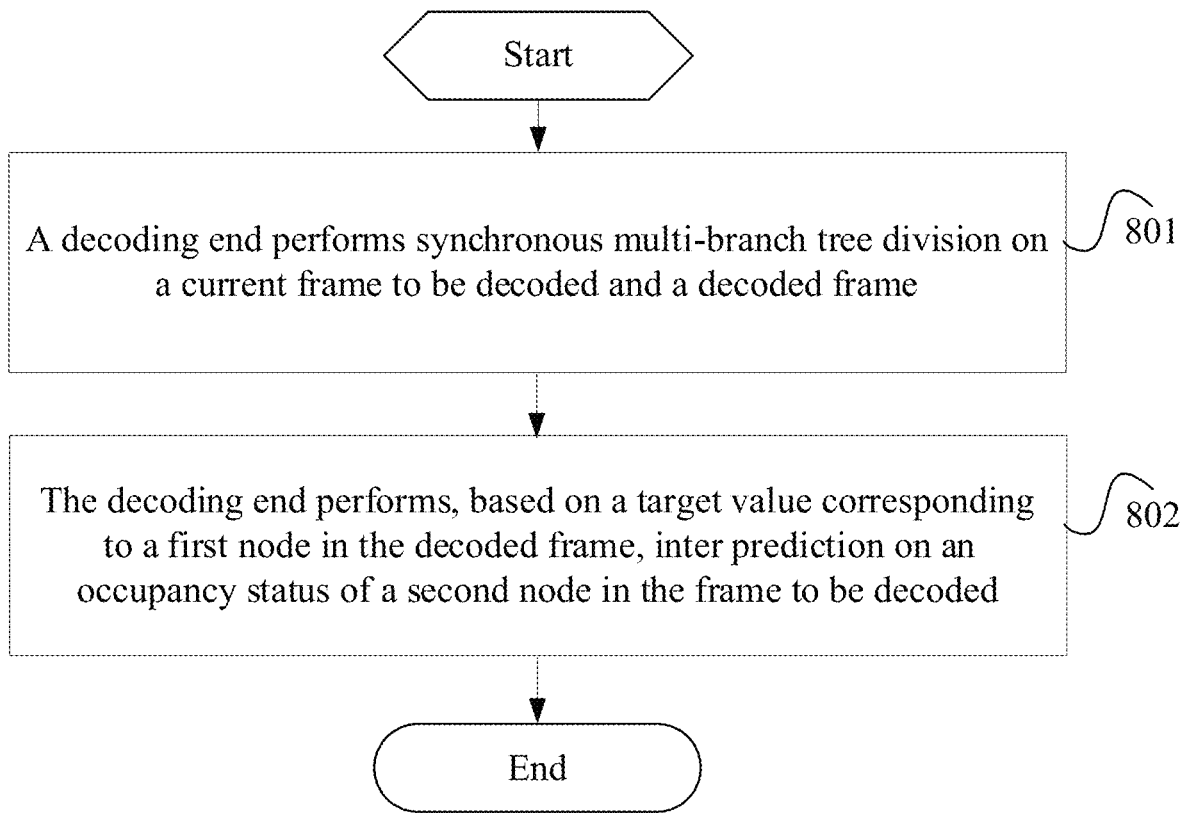
FIG. 8 is a schematic flowchart of a point cloud decoding processing method according to an embodiment of this application.

As shown in FIG. 8, an embodiment of this application further provides a point cloud decoding processing method, including the following steps.

Step 801. A decoding end performs synchronous multi-branch tree division on a current frame to be decoded and a decoded frame.

Step 802. The decoding end performs, based on a target value corresponding to a first node in the decoded frame, inter prediction on an occupancy status of a second node in the frame to be decoded, where the occupancy status includes: occupied or unoccupied.

A position of the first node in the decoded frame is the same as a position of the second node in the frame to be decoded, and the target value includes one of the following:

the number of points included in a space corresponding to the first node;

density of the points included in the space corresponding to the first node;

the number of points included in a first child node included in the first node, where the first node includes at least one first child node; and density of the points included in the first child node included in the first node.

Optionally, the target value includes the number of points included in the space corresponding to the first node or the density of the points included in the space corresponding to the first node, and the performing, based on a target value corresponding to a first node in the decoded frame, inter prediction on an occupancy status of a second node in the frame to be decoded includes:

if the target value is greater than a first preset threshold, predicting occupancy statuses of all child nodes of the second node in the frame to be decoded as occupied; or if the target value is less than or equal to a first preset threshold, predicting occupancy statuses of all child nodes of the second node in the frame to be decoded as unoccupied.

Optionally, the target value includes the number of points included in the first child node included in the first node or the density of the points included in the first child node included in the first node, and the performing, based on a target value corresponding to a first node in the decoded frame, inter prediction on an occupancy status of a second node in the frame to be decoded includes:

if the target value is greater than a second preset threshold, predicting an occupancy status of a second child node of the second node in the frame to be decoded as occupied; or if the target value is less than or equal to a second preset threshold, predicting an occupancy status of a second child node of the second node in the frame to be decoded as unoccupied, where a position of the first child node in the decoded frame is the same as a position of the second child node in the frame to be decoded.

Optionally, after the performing, based on a target value corresponding to a first node in the decoded frame, inter prediction on an occupancy status of a second node in the frame to be decoded, the method further includes:

obtaining, by the decoding end, first information based on a predicted occupancy status of the frame to be decoded, where the first information is used to determine a first context for decoding the frame to be decoded;

determining, by the decoding end, the first context based on the first information and second information corresponding to the frame to be decoded; and performing, by the decoding end based on the first context, entropy decoding on child node occupancy code information of the frame to be decoded.

Optionally, after the performing, based on a target value corresponding to a first node in the decoded frame, inter prediction on an occupancy status of a second node in the frame to be decoded, the method further includes:

determining, by the decoding end based on a predicted occupancy status of the frame to be decoded, a first target node with an occupancy status of being unoccupied and a second target node with an occupancy status of being occupied;

performing, by the decoding end based on a second context corresponding to the first target node, entropy decoding on occupancy code information of the first target node;

determining, by the decoding end based on a predicted occupancy status of the second target node, a third context; and performing, by the decoding end based on the third context, entropy decoding on occupancy code information of the second target node.

It should be noted that the encoding end encodes in the same way as the decoding end decodes. For the specific implementation of the decoding end, please refer to the decoding end. Details are not described herein again.

The decoding end in this embodiment of this application performs inter prediction on the occupancy status of the second node in the frame to be decoded by using the target value corresponding to the first node in the decoded frame, so that the occupancy status of the node can be accurately predicted, and accuracy of inter prediction can be ensured.

Figure 9:
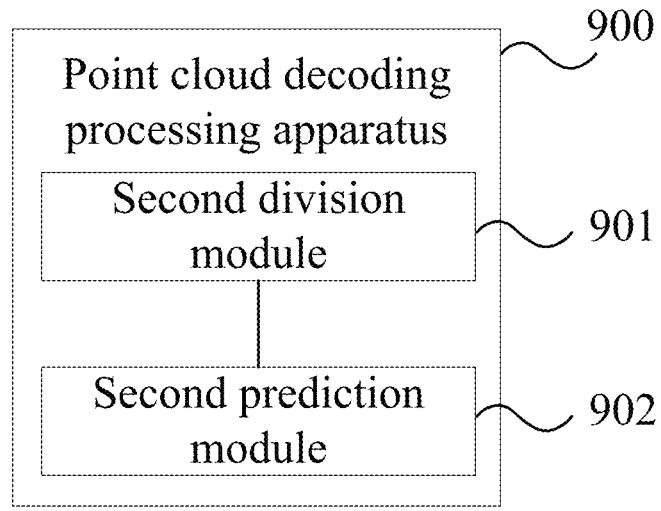
FIG. 9 is a schematic diagram of modules of a point cloud decoding processing apparatus according to an embodiment of this application.

As shown in FIG. 9, an embodiment of this application further provides a point cloud decoding processing apparatus 900, including:

a second division module 901, configured to perform synchronous multi-branch tree division on a current frame to be decoded and a decoded frame; and a second prediction module 902, configured to perform, based on a target value corresponding to a first node in the decoded frame, inter prediction on an occupancy status of a second node in the frame to be decoded, where the occupancy status includes: occupied or unoccupied, where a position of the first node in the decoded frame is the same as a position of the second node in the frame to be decoded, and the target value includes:

the number of points included in a space corresponding to the first node;

density of the points included in the space corresponding to the first node;

the number of points included in a first child node included in the first node, where the first node includes at least one first child node; and density of the points included in the first child node included in the first node.

Optionally, the target value includes the number of points included in the space corresponding to the first node or the density of the points included in the space corresponding to the first node, and the second prediction module 902 is configured to:

if the target value is greater than a first preset threshold, predict occupancy statuses of all child nodes of the second node in the frame to be decoded as occupied; or if the target value is less than or equal to a first preset threshold, predict occupancy statuses of all child nodes of the second node in the frame to be decoded as unoccupied.

Optionally, the target value includes the number of points included in the first child node included in the first node or the density of the points included in the first child node included in the first node, and the second prediction module 902 is configured to:

if the target value is greater than a second preset threshold, predict an occupancy status of a second child node of the second node in the frame to be decoded as occupied; or if the target value is less than or equal to a second preset threshold, predict an occupancy status of a second child node of the second node in the frame to be decoded as unoccupied, where a position of the first child node in the decoded frame is the same as a position of the second child node in the frame to be decoded.

Optionally, the apparatus further includes:

a second obtaining module, configured to obtain first information based on a predicted occupancy status of the frame to be decoded, where the first information is used to determine a first context for decoding the frame to be decoded;

a fourth determining module, configured to determine the first context based on the first information and second information corresponding to the frame to be decoded; and a first decoding module, configured to perform, based on the first context, entropy decoding on child node occupancy code information of the frame to be decoded.

Optionally, the apparatus further includes:

a fifth determining module, configured to determine, based on a predicted occupancy status of the frame to be decoded, a first target node with an occupancy status of being unoccupied and a second target node with an occupancy status of being occupied;

a second decoding module, configured to perform, based on a second context corresponding to the first target node, entropy decoding on occupancy code information of the first target node;

a sixth determining module, configured to determine, based on a predicted occupancy status of the second target node, a third context; and a third decoding module, configured to perform, based on the third context, entropy decoding on occupancy code information of the second target node.

It should be noted that the apparatus embodiment is an apparatus corresponding to the foregoing method. All implementations in the foregoing method embodiment are applicable to the apparatus embodiment, and a same technical effect can be achieved. Details are not described herein again.

Preferably, an embodiment of this application further provides a decoding device, including a processor, a memory, and a program or an instruction stored in the memory and executable on the processor. When the program or the instruction is executed by the processor, processes of the point cloud decoding processing method embodiment are implemented, and a same technical effect can be achieved. To avoid repetition, details are not described herein again.

An embodiment of this application further provides a readable storage medium. The computer readable storage medium stores a program or an instruction, and when the program or the instruction is executed by a processor, processes of the point cloud decoding processing method embodiment are performed, and a same technical effect can be achieved. To avoid repetition, details are not described herein again.

The computer-readable storage medium is, for example, a read-only memory (ROM for short), a random access memory (RAM for short), a magnetic disk, or an optical disc.

An embodiment of this application further provides a decoding device, including a processor and a communications interface, and the processor is configured to: perform synchronous multi-branch tree division on a current frame to be decoded and a decoded frame; and perform, based on a target value corresponding to a first node in the decoded frame, inter prediction on an occupancy status of a second node in the frame to be decoded, where the occupancy status includes: occupied or unoccupied, where A position of the first node in the decoded frame is the same as a position of the second node in the frame to be decoded, and the target value includes one of the following:

the number of points included in a space corresponding to the first node;

density of the points included in the space corresponding to the first node;

the number of points included in a first child node included in the first node, where the first node includes at least one first child node; and density of the points included in the first child node included in the first node.

Specifically, an embodiment of this application further provides a decoding device. Specifically, the structure of the decoding device is similar to that of the encoding device shown in FIG. 6. Details are not described herein again.

Optionally, the processor is configured to:

perform synchronous multi-branch tree division on a current frame to be decoded and a decoded frame; and perform, based on a target value corresponding to a first node in the decoded frame, inter prediction on an occupancy status of a second node in the frame to be decoded, where the occupancy status includes: occupied or unoccupied, where a position of the first node in the decoded frame is the same as a position of the second node in the frame to be decoded, and the target value includes one of the following:

the number of points included in a space corresponding to the first node;

density of the points included in the space corresponding to the first node;

the number of points included in a first child node included in the first node, where the first node includes at least one first child node; and density of the points included in the first child node included in the first node.

Optionally, the target value includes the number of points included in the space corresponding to the first node or the density of the points included in the space corresponding to the first node, and the processor is configured to:

if the target value is greater than a first preset threshold, predict occupancy statuses of all child nodes of the second node in the frame to be decoded as occupied; or if the target value is less than or equal to a first preset threshold, predict occupancy statuses of all child nodes of the second node in the frame to be decoded as unoccupied.

Optionally, the target value includes the number of points included in the first child node included in the first node or the density of the points included in the first child node included in the first node, and the processor is configured to:

if the target value is greater than a second preset threshold, predict an occupancy status of a second child node of the second node in the frame to be decoded as occupied; or if the target value is less than or equal to a second preset threshold, predict an occupancy status of a second child node of the second node in the frame to be decoded as unoccupied, where a position of the first child node in the decoded frame is the same as a position of the second child node in the frame to be decoded.

Optionally, the processor is further configured to:

obtain first information based on a predicted occupancy status of the frame to be decoded, where the first information is used to determine a first context for decoding the frame to be decoded;

determine the first context based on the first information and second information corresponding to the frame to be decoded; and perform, based on the first context, entropy decoding on child node occupancy code information of the frame to be decoded.

Optionally, the processor is further configured to:

determine, based on a predicted occupancy status of the frame to be decoded, a first target node with an occupancy status of being unoccupied and a second target node with an occupancy status of being occupied;

perform, based on a second context corresponding to the first target node, entropy decoding on occupancy code information of the first target node;

determine, based on a predicted occupancy status of the second target node, a third context; and perform, based on the third context, entropy decoding on occupancy code information of the second target node.

It should be noted that the encoding end and the decoding end mentioned in the embodiments of this application can be set in the same device, that is, the device can realize both the point cloud encoding processing function and the point cloud decoding processing function, and can also be set in different devices.

Figure 10:
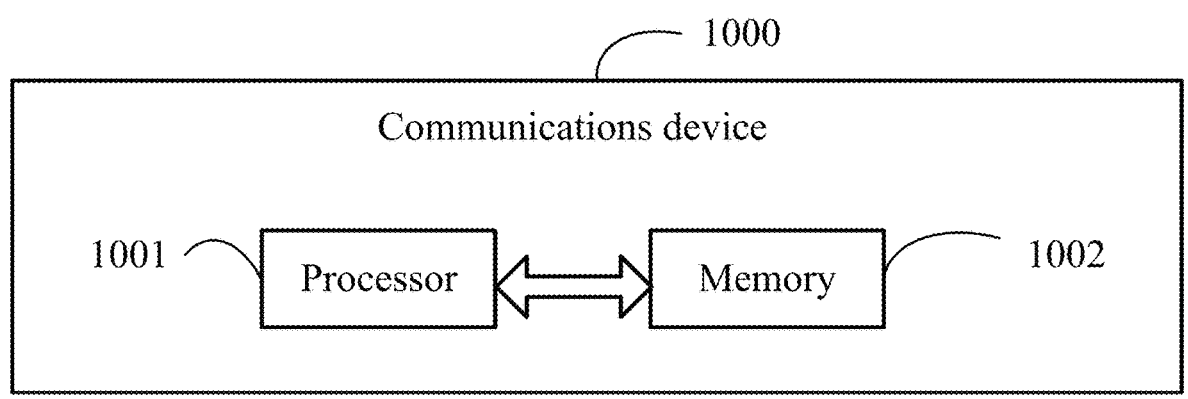
FIG. 10 is a block diagram of a structure of a communications device according to an embodiment of this application.

Optionally, as shown in FIG. 10, an embodiment of this application further provides a communications device 1000, including a processor 1001, a memory 1002, a program or an instruction stored in the memory 1002 and executable on the processor 1001. For example, when the communications device 1000 is an encoding device, the program or the instruction is executed by the processor 1001 to implement processes of the point cloud encoding processing method embodiment, and a same technical effect can be achieved. When the communications device 1000 is a decoding device, and the program or the instruction is executed by a processor 1001, processes of the point cloud decoding processing method embodiment are implemented, and a same technical effect can be achieved. To avoid repetition, details are not described herein again.

An embodiment of this application further provides a chip, the chip includes a processor and a communications interface, the communications interface is coupled to the processor, and the processor is configured to run a program or an instruction to implement processes of the point cloud encoding processing method embodiment or processes of the point cloud decoding processing method embodiment, and a same technical effect can be achieved. To avoid repetition, details are not described herein again.

It should be understood that the chip mentioned in this embodiment of this application may also be referred to as a system-level chip, a system chip, a chip system, or a system on chip.

An embodiment of this application further provides a computer program/program product. The computer program/program product is stored in a storage medium, and the computer program/program product is executed by at least one processor to implement processes of the point cloud encoding processing method embodiment or processes of the point cloud decoding processing method embodiment, and a same technical effect can be achieved. To avoid repetition, details are not described herein again.

An embodiment of this application further provides an encoding-decoding system, including an encoding device and a decoding device. The encoding device may be configured to perform steps of the point cloud encoding processing method, and the decoding device may be configured to perform steps of the point cloud decoding processing method.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by a statement "includes a . . . " does not preclude the presence of additional identical elements in the process, method, article, or apparatus that includes the element. In addition, it should be noted that the scope of the method and apparatus in the implementations of this application is not limited to performing functions in an illustrated or discussed sequence, and may further include performing the functions in a basically simultaneous manner or in a reverse sequence based on the functions concerned. For example, the described method may be performed in an order different from the described order, and steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific implementations. The foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A point cloud encoding processing method, comprising:

performing, by an encoding end, synchronous multi-branch tree division on a current frame to be encoded and an encoded frame, the synchronous multi-branch tree division means that after the frame to be encoded and the encoded frame are divided, sizes and positions of spaces comprised in the frame to be encoded and the encoded frame are consistent; and performing, by the encoding end based on a target value corresponding to a first node in the encoded frame, inter prediction on an occupancy status of a second node in the frame to be encoded, wherein the occupancy status comprises: occupied or unoccupied, wherein a position of the first node in the encoded frame is the same as a position of the second node in the frame to be encoded, and the target value comprises one of the following:

the number of points comprised in a space corresponding to the first node;

density of the points comprised in the space corresponding to the first node;

the number of points comprised in a first child node comprised in the first node, wherein the first node comprises at least one first child node; or density of the points comprised in the first child node comprised in the first node.

2. The method according to claim 1, wherein the target value comprises the number of points comprised in the space corresponding to the first node or the density of the points comprised in the space corresponding to the first node, and the performing, based on a target value corresponding to a first node in the encoded frame, inter prediction on an occupancy status of a second node in the frame to be encoded comprises:

if the target value is greater than a first preset threshold, predicting occupancy statuses of all child nodes of the second node in the frame to be encoded as occupied; or if the target value is less than or equal to a first preset threshold, predicting occupancy statuses of all child nodes of the second node in the frame to be encoded as unoccupied.

3. The method according to claim 1, wherein the target value comprises the number of points comprised in the first child node comprised in the first node or the density of the points comprised in the first child node comprised in the first node, and the performing, based on a target value corresponding to a first node in the encoded frame, inter prediction on an occupancy status of a second node in the frame to be encoded comprises:

if the target value is greater than a second preset threshold, predicting an occupancy status of a second child node of the second node in the frame to be encoded as occupied; or if the target value is less than or equal to a second preset threshold, predicting an occupancy status of a second child node of the second node in the frame to be encoded as unoccupied, wherein a position of the first child node in the encoded frame is the same as a position of the second child node in the frame to be encoded.

4. The method according to claim 2, wherein after the performing, based on a target value corresponding to a first node in the encoded frame, inter prediction on an occupancy status of a second node in the frame to be encoded, the method further comprises:

obtaining, by the encoding end, first information based on a predicted occupancy status of the frame to be encoded, wherein the first information is used to determine a first context for encoding the frame to be encoded;

determining, by the encoding end, the first context based on the first information and second information corresponding to the frame to be encoded; and performing, by the encoding end based on the first context, entropy encoding on child node occupancy code information of the frame to be encoded.

5. The method according to claim 2, wherein after the performing, based on a target value corresponding to a first node in the encoded frame, inter prediction on an occupancy status of a second node in the frame to be encoded, the method further comprises:

determining, by the encoding end based on a predicted occupancy status of the frame to be encoded, a first target node with an occupancy status of being unoccupied and a second target node with an occupancy status of being occupied;

performing, by the encoding end based on a second context corresponding to the first target node, entropy encoding on occupancy code information of the first target node;

determining, by the encoding end based on a predicted occupancy status of the second target node, a third context; and performing, by the encoding end based on the third context, entropy encoding on occupancy code information of the second target node.

6. A point cloud decoding processing method, comprising:

performing, by a decoding end, synchronous multi-branch tree division on a current frame to be decoded and a decoded frame, the synchronous multi-branch tree division means that after the frame to be decoded and the decoded frame are divided, sizes and positions of spaces comprised in the frame to be decoded and the decoded frame are consistent; and performing, by the decoding end based on a target value corresponding to a first node in the decoded frame, inter prediction on an occupancy status of a second node in the frame to be decoded, wherein the occupancy status comprises: occupied or unoccupied, wherein a position of the first node in the decoded frame is the same as a position of the second node in the frame to be decoded, and the target value comprises one of the following:

the number of points comprised in a space corresponding to the first node;

density of the points comprised in the space corresponding to the first node;

the number of points comprised in a first child node comprised in the first node, wherein the first node comprises at least one first child node; or density of the points comprised in the first child node comprised in the first node.

7. The method according to claim 6, wherein the target value comprises the number of points comprised in the space corresponding to the first node or the density of the points comprised in the space corresponding to the first node, and the performing, based on a target value corresponding to a first node in the decoded frame, inter prediction on an occupancy status of a second node in the frame to be decoded comprises:

if the target value is greater than a first preset threshold, predicting occupancy statuses of all child nodes of the second node in the frame to be decoded as occupied; or if the target value is less than or equal to a first preset threshold, predicting occupancy statuses of all child nodes of the second node in the frame to be decoded as unoccupied.

8. The method according to claim 7, wherein the target value comprises the number of points comprised in the first child node comprised in the first node or the density of the points comprised in the first child node comprised in the first node, and the performing, based on a target value corresponding to a first node in the decoded frame, inter prediction on an occupancy status of a second node in the frame to be decoded comprises:

if the target value is greater than a second preset threshold, predicting an occupancy status of a second child node of the second node in the frame to be decoded as occupied; or if the target value is less than or equal to a second preset threshold, predicting an occupancy status of a second child node of the second node in the frame to be decoded as unoccupied, wherein a position of the first child node in the decoded frame is the same as a position of the second child node in the frame to be decoded.

9. The method according to claim 7, wherein after the performing, based on a target value corresponding to a first node in the decoded frame, inter prediction on an occupancy status of a second node in the frame to be decoded, the method further comprises:

obtaining, by the decoding end, first information based on a predicted occupancy status of the frame to be decoded, wherein the first information is used to determine a first context for decoding the frame to be decoded;

determining, by the decoding end, the first context based on the first information and second information corresponding to the frame to be decoded; and performing, by the decoding end based on the first context, entropy decoding on child node occupancy code information of the frame to be decoded.

10. The method according to claim 7, wherein after the performing, based on a target value corresponding to a first node in the decoded frame, inter prediction on an occupancy status of a second node in the frame to be decoded, the method further comprises:

determining, by the decoding end based on a predicted occupancy status of the frame to be decoded, a first target node with an occupancy status of being unoccupied and a second target node with an occupancy status of being occupied;

performing, by the decoding end based on a second context corresponding to the first target node, entropy decoding on occupancy code information of the first target node;

determining, by the decoding end based on a predicted occupancy status of the second target node, a third context; and performing, by the decoding end based on the third context, entropy decoding on occupancy code information of the second target node.

11. An encoding device, comprising a processor and a memory, wherein the memory stores a program or an instruction that can be run on the processor, wherein the program or the instruction, when executed by the processor, causes the encoding device to perform steps of the point cloud encoding processing method according to claim 1 are implemented.

12. The encoding device according to claim 11, wherein the target value comprises the number of points comprised in the space corresponding to the first node or the density of the points comprised in the space corresponding to the first node, when performing, based on a target value corresponding to a first node in the encoded frame, inter prediction on an occupancy status of a second node in the frame to be encoded, the program or the instruction, when executed by the processor, causes the encoding device to perform:

if the target value is greater than a first preset threshold, predicting occupancy statuses of all child nodes of the second node in the frame to be encoded as occupied; or if the target value is less than or equal to a first preset threshold, predicting occupancy statuses of all child nodes of the second node in the frame to be encoded as unoccupied.

13. The encoding device according to claim 11, wherein the target value comprises the number of points comprised in the first child node comprised in the first node or the density of the points comprised in the first child node comprised in the first node, when performing, based on a target value corresponding to a first node in the encoded frame, inter prediction on an occupancy status of a second node in the frame to be encoded, the program or the instruction, when executed by the processor, causes the encoding device to perform:

if the target value is greater than a second preset threshold, predicting an occupancy status of a second child node of the second node in the frame to be encoded as occupied; or if the target value is less than or equal to a second preset threshold, predicting an occupancy status of a second child node of the second node in the frame to be encoded as unoccupied, wherein a position of the first child node in the encoded frame is the same as a position of the second child node in the frame to be encoded.

14. A decoding device, comprising a processor and a memory, wherein the memory stores a program or an instruction that can be run on the processor, wherein the program or the instruction, when executed by the processor, causes the decoding device to perform:

performing synchronous multi-branch tree division on a current frame to be decoded and a decoded frame, the synchronous multi-branch tree division means that after the frame to be decoded and the decoded frame are divided, sizes and positions of spaces comprised in the frame to be decoded and the decoded frame are consistent; and performing, based on a target value corresponding to a first node in the decoded frame, inter prediction on an occupancy status of a second node in the frame to be decoded, wherein the occupancy status comprises: occupied or unoccupied, wherein a position of the first node in the decoded frame is the same as a position of the second node in the frame to be decoded, and the target value comprises one of the following:

the number of points comprised in a space corresponding to the first node;

density of the points comprised in the space corresponding to the first node;

the number of points comprised in a first child node comprised in the first node, wherein the first node comprises at least one first child node; or density of the points comprised in the first child node comprised in the first node.

15. The decoding device according to claim 14, wherein the target value comprises the number of points comprised in the space corresponding to the first node or the density of the points comprised in the space corresponding to the first node, when performing, based on a target value corresponding to a first node in the decoded frame, inter prediction on an occupancy status of a second node in the frame to be decoded, the program or the instruction, when executed by the processor, causes the decoding device to perform:

if the target value is greater than a first preset threshold, predicting occupancy statuses of all child nodes of the second node in the frame to be decoded as occupied; or if the target value is less than or equal to a first preset threshold, predicting occupancy statuses of all child nodes of the second node in the frame to be decoded as unoccupied.

16. The decoding device according to claim 15, wherein the target value comprises the number of points comprised in the first child node comprised in the first node or the density of the points comprised in the first child node comprised in the first node, when performing, based on a target value corresponding to a first node in the decoded frame, inter prediction on an occupancy status of a second node in the frame to be decoded, the program or the instruction, when executed by the processor, causes the decoding device to perform:

if the target value is greater than a second preset threshold, predicting an occupancy status of a second child node of the second node in the frame to be decoded as occupied; or if the target value is less than or equal to a second preset threshold, predicting an occupancy status of a second child node of the second node in the frame to be decoded as unoccupied, wherein a position of the first child node in the decoded frame is the same as a position of the second child node in the frame to be decoded.

17. The decoding device according to claim 15, wherein after performing, based on a target value corresponding to a first node in the decoded frame, inter prediction on an occupancy status of a second node in the frame to be decoded, the program or the instruction, when executed by the processor, causes the decoding device to further perform:

obtaining first information based on a predicted occupancy status of the frame to be decoded, wherein the first information is used to determine a first context for decoding the frame to be decoded;

determining the first context based on the first information and second information corresponding to the frame to be decoded; and performing, based on the first context, entropy decoding on child node occupancy code information of the frame to be decoded.

18. The decoding device according to claim 15, wherein after performing, based on a target value corresponding to a first node in the decoded frame, inter prediction on an occupancy status of a second node in the frame to be decoded, the program or the instruction, when executed by the processor, causes the decoding device to further perform:

determining, based on a predicted occupancy status of the frame to be decoded, a first target node with an occupancy status of being unoccupied and a second target node with an occupancy status of being occupied;

performing, based on a second context corresponding to the first target node, entropy decoding on occupancy code information of the first target node;

determining, based on a predicted occupancy status of the second target node, a third context; and performing, based on the third context, entropy decoding on occupancy code information of the second target node.

19. A non-transitory readable storage medium, wherein the non-transitory readable storage medium stores a program or an instruction, and when the program or the instruction is executed by a processor, steps of the point cloud encoding processing method according to claim 1 are implemented.

20. A non-transitory readable storage medium, wherein the non-transitory readable storage medium stores a program or an instruction, and when the program or the instruction is executed by a processor, steps of the point cloud decoding processing method according to claim 6 are implemented.

* * * * *